(12) United States Patent
Steinberg et al.

(10) Patent No.: US 11,496,712 B2
(45) Date of Patent: Nov. 8, 2022

(54) ARRANGEMENT FOR WIRELESS TRANSMISSION OF ELECTRICAL SIGNALS IN A MOTOR VEHICLE

(71) Applicant: NEXANS, Paris (FR)

(72) Inventors: Helmut Steinberg, Stoernstein (DE); Frank Schroeer, Weiden (DE)

(73) Assignee: NEXANS, Courbevoie (FR)

( * ) Notice: Subject to any disclaimer, the term of this patent is extended or adjusted under 35 U.S.C. 154(b) by 917 days.

(21) Appl. No.: 13/924,805

(22) Filed: Jun. 24, 2013

(65) Prior Publication Data

US 2014/0002653 A1 Jan. 2, 2014

(30) Foreign Application Priority Data

Jun. 27, 2012 (EP) .................................... 12305752
May 30, 2013 (EP) .................................... 13305709

(51) Int. Cl.
*H04N 7/18* (2006.01)
*B60R 16/027* (2006.01)
*H01R 35/02* (2006.01)
*H01F 38/18* (2006.01)

(52) U.S. Cl.
CPC ........... *H04N 7/181* (2013.01); *B60R 16/027* (2013.01); *H01R 35/025* (2013.01); *H01F 38/18* (2013.01)

(58) Field of Classification Search
CPC ...................................................... H04N 7/181
See application file for complete search history.

(56) References Cited

U.S. PATENT DOCUMENTS

| 5,643,002 A * | 7/1997 | Wolf .................... H01R 35/025 439/15 |
| 6,542,758 B1 * | 4/2003 | Chennakeshu ..... B60R 11/0241 455/41.2 |
| 7,329,135 B2 * | 2/2008 | Nachbauer et al. .......... 439/164 |
| 8,436,485 B1 * | 5/2013 | Smith ....................... F03D 9/11 290/55 |
| 2003/0027446 A1 * | 2/2003 | Huscher ............... H01R 35/025 439/164 |
| 2005/0115761 A1 * | 6/2005 | Dinda et al. ................... 180/402 |
| 2008/0215700 A1 * | 9/2008 | Pillar et al. .................... 709/212 |
| 2009/0142937 A1 * | 6/2009 | Simonis ................ B60R 16/027 439/15 |
| 2011/0153160 A1 * | 6/2011 | Hesseling .............. B60K 35/00 701/41 |

FOREIGN PATENT DOCUMENTS

EP 0803406 B1 * 7/2001 ........... B60R 16/027

* cited by examiner

*Primary Examiner* — Amir Shahnami
(74) *Attorney, Agent, or Firm* — Sofer & Haroun, LLP

(57) ABSTRACT

An arrangement for wireless transmission of electrical signals in a motor vehicle maintains a cassette equipped with a stator (3) and a rotor (4) rotatably mounted in the stator (3) is arranged on the steering wheel of the motor vehicle, where the cassette has at least one electrical line extending in windings mounted between stator and rotor. The stator of the cassette is connected to the steering column, while the rotor is connected to the steering wheel. The transmitter (6) is arranged in the immediate vicinity of the stator (3) of the cassette and the receiver (7) is mechanically connected to the rotor (4) of the cassette and electrically to at least one electrical line (9) with a display (8) for displaying received signals.

3 Claims, 2 Drawing Sheets

ARRANGEMENT FOR WIRELESS TRANSMISSION OF ELECTRICAL SIGNALS IN A MOTOR VEHICLE

RELATED APPLICATIONS

This application claims the benefit of priority from European Patent Application Nos. EP 12 305 752.3, filed on Jun. 27, 2012 and EP 13 305 709.1, filed on May 30, 2013, the entirety of which are incorporated by reference.

BACKGROUND

Field of the Invention

The present invention relates to an arrangement for wireless transmission of electrical signals in a motor vehicle which is equipped with a steering wheel capable of being turned in a stationary steering column, in which a transmitter for the electrical signals is mounted on the steering wheel and a receiver for the signals is mounted stationary in the motor vehicle (DE 103 43 147 A1).

Description of Related Art

Such an arrangement is required for example, for transmitting the information (images) recorded by a camera in the back end area of a motor vehicle—in the following, called "vehicle" for short—to a display mounted in the vehicle, for example, to a screen. Such an arrangement becomes more important if the entire surroundings of a vehicle can and ought to be monitored in a so-called "bird-view" system by means of cameras. However, any internal information of the vehicle can be transmitted between transmitter and receiver. The electrical lines which are usually present in a vehicle in the area of the steering wheel are not suitable for transmitting a large quantity of data, such as video signals. Such lines are used, for example, for actuating an airbag or a horn.

The above mentioned DE 103 43 147 A1 discloses a device for wireless transmission of electrical signals from a transmitter module mounted on the steering wheel of a vehicle to a receiver module mounted on a stationary area or on the chassis of the vehicle. The transmitter module and the receiver module are both equipped with a microcontroller. The microcontroller of the receiver module converts received signals into switching and/or control signals for electrical devices of the vehicle.

OBJECTS AND SUMMARY

The invention is based on the object of constructing the arrangement described in the beginning in such a way that the signals received by the receiver can be displayed in a simple manner and by utilizing structural components which are present in the vehicle, the signals can be displayed so as to be recognizable by the vehicle driver.

In accordance with the invention, this object is met in that
a cassette, equipped with a stator and a rotor rotatable in the stator, is arranged in the steering wheel of the motor vehicle, wherein the cassette includes at least one electrical line extending in windings and mounted between the stator and the motor, wherein the line is secured at one end to the stator and with the other end at the rotor of the cassette, wherein the stator of the cassette is connected to the steering column, while the rotor is connected to the steering wheel,
the transmitter is mounted in the immediate vicinity of the stator of the cassette on a stationary part of the motor vehicle, and the receiver is connected mechanically to the rotor of the cassette and electrically by means of an electrical line to a display which displays received signals.

This arrangement is of simple construction and limited in a compact manner to the area of the steering wheel of the respective vehicle. Consequently, the transmitter and the receiver are mounted closely next to each other, so that interference of other components by the signals transmitted between the two devices can be excluded in the same way as interference of the wireless transmission through other electromagnetic fields. Advantageously, in the present arrangement, the elements of a cassette arranged in the steering wheel and including a stator and a rotor can be utilized, wherein in the cassette is arranged an electrical line extending in windings serving for the current supply of components of the motor vehicle. The distance between the transmitter and the receiver is optimal when the transmitter is mounted directly on the stator of the cassette. The signals or information received by the receiver are made visible on a display which is also provided on the steering wheel, so that for example, when driving backwards the vehicle driver is continuously informed about possible obstacles and other situations around the vehicle or also, if the vehicle is equipped accordingly, the vehicle driver is informed continuously about possible obstacles or other situations around the vehicle. The line already present in the cassette can be advantageously utilized for the operation of the receiver and the display.

Cassettes which consist of a stator and a rotor rotatably mounted in the stator, between which is arranged at least one electrical line extending in windings, are disclosed, for example, in EP 1 973 205 A1. They essentially serve for the current supply of the components of a vehicle and can follow the turning movement of the steering wheel without the use of sliding contacts. Each electrical line used is advantageously constructed as a flat ribbon line. It can extend in several windings corresponding to the balance of a watch. The line can also be composed of two areas with oppositely directed winding directions which are connected by a reversal point, in accordance with so-called reversal technology. It is also possible to provide a guide body between the two areas of such a line. In the embodiment using reversal technology, it is also possible to accommodate two or more lines.

BRIEF DESCRIPTION OF THE DRAWINGS

An embodiment of the subject matter of the invention is illustrated in the drawings.

In the drawing.

DETAILED DESCRIPTION

Figure 1:
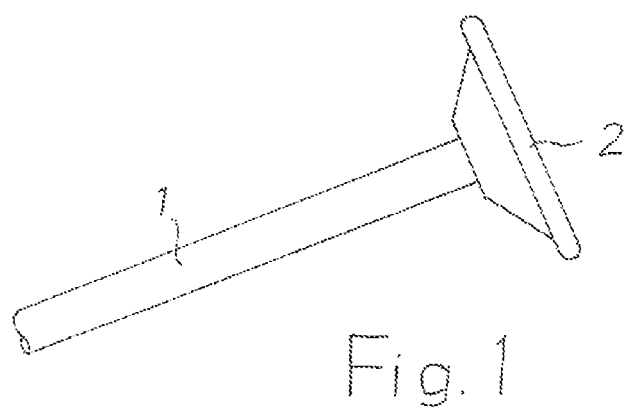
FIG. 1 schematically shows a steering wheel mounted on the steering column of a vehicle.

FIG. 1 shows a steering column 1 of a vehicle without further details, in which a steering wheel 2 is mounted so as to be capable of turning about its axis.

Arranged in the steering wheel 2 is, for example, a cassette K which serves for the current supply of components of the vehicle. The cassette K consists of a stator 3 connected in the assembled state to the steering column 1 and a rotor 4 arranged so as to be rotatable about an axis A and connected to the steering wheel. In the illustrated embodiment, an electrical line 5 extending in windings is arranged between stator 3 and rotor 4; advantageously, the electrical line is a flat ribbon line or a flat conductor ribbon line. It is connected at one end to the stator 3 of the cassette K and at the other end to the rotor 4 thereof. In such a line at least two electrical conductors are arranged extending parallel and at a distance from each other. The conductors are embedded in insulating material. In the assembled state, the line 5 is connected to a voltage source of the vehicle, preferably the battery.

A transmitter 6 for electrical signals, particularly for video signals, is mounted on a stationary part of the vehicle, wherein the transmitter 6 is connected for its current supply to the voltage source of the vehicle. In accordance with the illustrations in FIGS. 2 and 4, the transmitter 6 is advantageously arranged directly on the stator 3 of the cassette K. Information is fed to the transmitter 6 by "sources," such as cameras, arranged in or on the vehicle, which are transmitted through wireless transmission to a receiver 7 for electrical signals.

Figure 2:
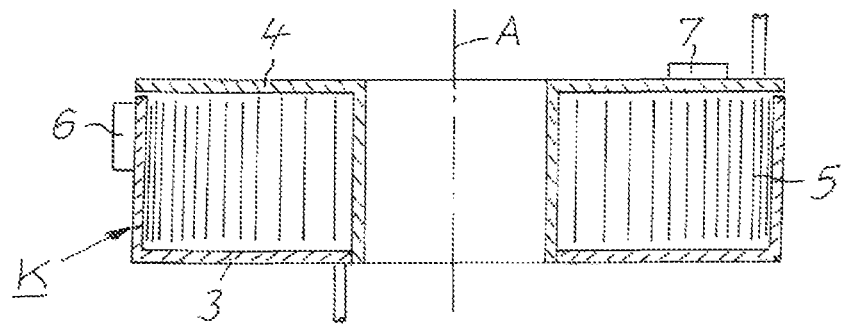
FIG. 2 shows, also schematically, a sectional view of a cassette to be mounted in a steering wheel, on a larger scale.
Figure 4:
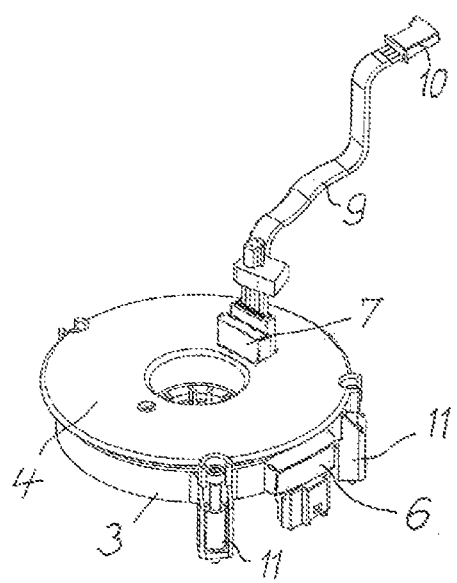
FIG. 4 shows the arrangement according to the invention, also in a schematic illustration.

The receiver 7 is connected to the rotor 4 of the cassette K. It is advantageously mounted directly on the rotor 4, as can be seen in FIGS. 2 and 4. The receiver can be connected for its current supply electrically conductively to the line 5 of the cassette K. A display 8, preferably constructed as a screen, is connected to the receiver 7 through an electrical line 9. The display 8 can also be electrically connected for its current supply to the line 5 of the cassette K. This can take place advantageously through the line 9 through which the signals received by the receiver 7 are also transmitted.

The line 9 is connected to a plug 10 in accordance with the illustration of FIG. 4 by means of which it can be connected electrically conductively to the display 8. The signals delivered by the transmitter 6 are converted or processed in the display 8 in such a way that the display 8 makes available to the vehicle driver clearly recognizable information. In the case of a display constructed as a screen, the display may be an image. The screws 11, also shown in FIG. 4, serve for fastening the stator 3 of the cassette K to the steering column 1 of the vehicle.

As can be seen particularly from FIG. 4, the distance between the transmitter 6 and the receiver 7 is very short. Therefore, as already mentioned, an interference of other devices or components of the vehicle through the signals transmitted between the transmitter 6 and the receiver 7 can also be excluded with great certainty, such as an interference of the wireless transmission through external electromagnetic fields.

Figure 3:
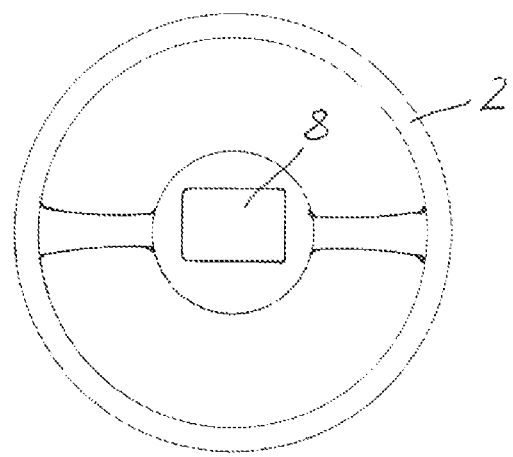
FIG. 3 is a top view of a steering wheel.

The display 8 is advantageously mounted directly on the steering wheel 2, as it is schematically illustrated in FIG. 3. The position of the display 8 on the steering wheel 2 must be selected such that the field of vision of the vehicle driver is not impaired. Since the display 8 is also turned when the steering wheel 2 is turned, it should be mounted as centrally as possible on the steering wheel 2. The information which can be seen on the display 8, particularly an image, can be turned electronically using conventional technology, so that it has always the same position independent of the deflection of the steering wheel 2 when the steering when is turned.

The invention claimed is:

1. An arrangement for wireless transmission of electrical signals in a motor vehicle, said arrangement comprising:
   a wireless transmitter and a wireless receiver for wireless transmission of said electrical signals;
   a cassette having a stator and a rotor, said rotor rotatably mounted in the stator, and an electrical line in the form of a ribbon cable mounted between the stator and the rotor, extending in windings; wherein within said cassette the electrical line is, at one end fastened to the stator and at the other end fastened to the rotor,
   wherein said arrangement is within said motor vehicle, the motor vehicle having a steering wheel which is capable of turning within a stationary steering column,
   wherein the stator of the cassette is connected to the steering column, while the rotor is connected to the steering wheel;
   wherein said wireless transmitter is mounted directly on said stator of said cassette and wherein said wireless receiver is mounted directly on said rotor of said cassette
   wherein said wireless transmitter is configured to receive said electrical signals, which include continuous video signals, and to wirelessly transmit said continuous video signals to said wireless receiver,
   wherein a display for displaying received continuous video signals is mounted directly on a front face of said steering wheel and electrically connected to said electrical line by use of a separate electrical line, which is connected to said electrical line, said separate electrical line has a plug by means of which it can be connected electrically conductively to said display; and
   wherein the wireless receiver as well as the display are conductively connected for their current supply to said electrical line of said cassette,
   such that during said rotation of said steering wheel and said rotor, said wireless receiver remains in proximity to said wireless transmitter on said stator, preventing interference to said wirelessly transmitted signals from other components in said motor vehicle.

2. Arrangement according to claim 1, wherein the wireless transmitter is mounted directly on the stator of the cassette.

3. Arrangement according to claim 1, wherein the display is constructed as a screen.

* * * * *